(12) United States Patent
Breeze

(10) Patent No.: US 10,294,992 B2
(45) Date of Patent: May 21, 2019

(54) FIXED ROLLING ELEMENT BEARING ASSEMBLY

(71) Applicant: Bowman International Limited, Abingdon (GB)

(72) Inventor: Ian Breeze, Abingdon (GB)

(73) Assignee: Bowman International Limited, Abingdon (GB)

( * ) Notice: Subject to any disclaimer, the term of this patent is extended or adjusted under 35 U.S.C. 154(b) by 0 days.

(21) Appl. No.: 15/827,694

(22) Filed: Nov. 30, 2017

(65) Prior Publication Data

US 2018/0149198 A1  May 31, 2018

(30) Foreign Application Priority Data

Nov. 30, 2016  (GB) .................................. 1620311.9

(51) Int. Cl.
| | | |
|---|---|---|
| *F16C 33/46* | (2006.01) | |
| *F16C 33/66* | (2006.01) | |
| *F16C 19/26* | (2006.01) | |
| *F16C 19/36* | (2006.01) | |
| *F16C 33/78* | (2006.01) | |

(Continued)

(52) U.S. Cl.
CPC ........ *F16C 33/4605* (2013.01); *F16C 19/361* (2013.01); *F16C 33/586* (2013.01); *F16C 33/605* (2013.01); *F16C 33/6681* (2013.01); *F16C 33/7893* (2013.01); *F16C 35/042* (2013.01); *F16C 35/063* (2013.01); *F16C 35/067* (2013.01); *F16C 35/073* (2013.01);

(Continued)

(58) Field of Classification Search
CPC .... F16C 33/4605; F16C 33/60; F16C 33/605; F16C 33/7893; F16C 35/067; F16C 19/26; F16C 33/6681; F16C 33/586; F16C 2226/10; F16C 2226/50; F16C 35/063; F16C 35/042; F16C 35/073
See application file for complete search history.

(56) References Cited

U.S. PATENT DOCUMENTS 708,475 A * 9/1902 Henderson ............... F16C 19/49
                                                              384/552
1,296,827 A * 3/1919 Lyons et al. .......... F16C 19/545
                                                              384/454

(Continued)

FOREIGN PATENT DOCUMENTS

| DE | 1914884 U | 4/1965 |
| DE | 10119894 A1 | 4/2002 |
| DE | 102009038794 A1 | 3/2011 |

OTHER PUBLICATIONS

Search Report of Related UK Application GB1620311.9, dated May 18, 2017.

(Continued)

*Primary Examiner* — Alan B Waits
(74) *Attorney, Agent, or Firm* — McGeary Cukor LLC; Kenneth Ottesen; Jason Paul DeMont

(57) ABSTRACT

The invention provides a fixed rolling element bearing assembly comprising: a housing; an inner race for attaching to a rotating shaft; a cage and rolling element assembly positioned around the inner race; first and second positional locators for positioning the cage and rolling element assembly between inner edges thereof; a thrustwasher adjacent an outer edge of either of the first or second positional locator and fixably connected to the housing.

10 Claims, 13 Drawing Sheets

(51) Int. Cl.
*F16C 35/063* (2006.01)
*F16C 35/067* (2006.01)
*F16C 33/60* (2006.01)
*F16C 35/04* (2006.01)
*F16C 35/073* (2006.01)
*F16C 33/58* (2006.01)

(52) U.S. Cl.
CPC .......... *F16C 19/26* (2013.01); *F16C 2226/10* (2013.01); *F16C 2226/50* (2013.01)

(56) References Cited

U.S. PATENT DOCUMENTS

| | | | | |
|---|---|---|---|---|
| 3,007,752 | A * | 11/1961 | Gales | F16C 19/46 277/361 |
| 3,166,363 | A | 1/1965 | Kay | |
| 3,168,359 | A * | 2/1965 | Murphy | F16C 19/381 384/454 |
| 4,469,381 | A * | 9/1984 | McGuffie | F16C 19/166 384/453 |
| 4,557,614 | A | 12/1985 | Knappe | |
| 4,895,461 | A * | 1/1990 | Stella | F16C 19/49 384/454 |
| 4,997,297 | A * | 3/1991 | Blount | F16C 19/26 384/476 |
| 5,069,560 | A | 12/1991 | Niedermeier et al. | |
| 5,080,502 | A * | 1/1992 | Diedrich | B60B 33/0028 384/484 |
| 5,197,808 | A * | 3/1993 | Takata | F16C 33/605 384/493 |
| 5,228,788 | A * | 7/1993 | Vinciguerra | F16C 19/26 29/447 |
| 6,375,576 | B1 * | 4/2002 | Margerie | F16C 33/605 464/111 |
| 2003/0110937 | A1 * | 6/2003 | Lang | F04B 1/0417 92/72 |
| 2004/0131296 | A1 * | 7/2004 | Friedrich | F16C 19/26 384/561 |
| 2012/0181148 | A1 * | 7/2012 | Ueno | B65G 17/38 198/500 |
| 2013/0272638 | A1 | 10/2013 | Molo et al. | |
| 2014/0029887 | A1 * | 1/2014 | Aust | F16C 33/605 384/579 |
| 2014/0070154 | A1 * | 3/2014 | Win | B66D 3/04 254/416 |
| 2014/0147070 | A1 * | 5/2014 | Aust | F16C 19/46 384/569 |
| 2014/0199010 | A1 * | 7/2014 | Misada | F16C 33/6611 384/470 |
| 2015/0233420 | A1 * | 8/2015 | Bogvad | F16C 25/083 384/99 |
| 2015/0285307 | A1 * | 10/2015 | Mola | F16C 19/26 384/473 |
| 2015/0285308 | A1 * | 10/2015 | Kanamoto | F16C 19/184 384/504 |
| 2015/0330450 | A1 * | 11/2015 | Aust | F16C 35/077 384/564 |
| 2016/0333938 | A1 | 11/2016 | Parker | |

OTHER PUBLICATIONS

WIPO, International Search Report, International Application No. PCT/EP2017/081025, dated Feb. 22, 2018.
GB 2 192 672 A (Rolls Royce PLC) Jan. 20, 1988 (Jan. 20, 1988), p. 1, line 55-line 89, figure 1.
JP 2007 099260 A (NSK Ltd) Apr. 19, 2007 (Apr. 19, 2007), figure 3.
DE 90 05 328 U1 (SKF Kugellagerfabriken GmbH) Jul. 12, 1990 (Jul. 12, 1990) p. 1, line 24—p. 3, line 8, figure.
DE 19 95 792 U (SKF Kugellagerfabriken GmbH [DE]) Oct. 31, 1968 (Oct. 31, 1968) p. 2, paragraph 2; figures.
DE 29 22 316 A1 (Kugelfischer G Schaefer & Co) Dec. 11, 1980 (Dec. 11, 1980) p. 3, paragraph 2—p. 5, paragraph 3; figure.

* cited by examiner

FIXED ROLLING ELEMENT BEARING ASSEMBLY

RELATED APPLICATIONS

This application claims priority to United Kingdom application no. GB 1620311.9, filed on Nov. 30, 2016, which is incorporated herein by reference.

BACKGROUND TO THE INVENTION

Field of the Invention:

The invention relates to an improved design for a fixed rolling element bearing assembly.

Description of the Related Art:

It is known in the art to provide free and fixed rolling element bearing assemblies, each utilising; a clamp ring assembly (bearing inner race and clamp collars), a cage and rolling element assembly, and a bearing outer race (fitted into a bearing housing), all of which is positioned in use around a shaft.

Example applications of such assemblies include, but are not limited to, automotive and truck transmissions, agricultural and construction equipment, pumps and compressors, and two-cycle engines such as marine outboards and garden equipment.

An aim of the invention is to provide an improved fixed rolling element bearing assembly.

SUMMARY OF THE INVENTION

According to the invention there is provided a housing; an inner race for attaching to a rotating shaft; a cage and rolling element assembly positioned around the inner race; first and second positional locators for positioning the cage and rolling element assembly between inner edges thereof; a thrustwasher adjacent an outer edge of either the first or second positional locator and fixably connected to the housing.

The fixed rolling element bearing assembly may further comprise first and second thrustwashers each respectively adjacent an outer edge of the first and second positional locator and fixably connected to the housing.

The first and second positional locators may comprise first and second protrusions on the inner race.

The first and second positional locators may comprise first and second clamping rings for clamping the inner race to the rotating shaft.

The first and second positional locators may comprise circumferential protrusions around the inner race, the protrusions being spaced apart from each other by a distance to accommodate the cage and rolling element assembly.

The cage and rolling element assembly may be rotatable with respect to the inner race.

The inner race may be provided with a circumferential protrusion between the first and second positional locators to provide a diameter dimension to accommodate the cage and rolling element assembly.

The thrustwasher may have an outer circumference with a first diameter and an inner circumference with a second diameter smaller than the first, the inner circumference of the thrustwasher being smaller than an outer circumference of a positional locator, wherein the positional locator is shaped to allow the thrustwasher to be located adjacent the positional locator and around the inner race.

There may be provided lubrication grooves on the outside edges of at least one of the first and second positional locators. The lubrication grooves may extend in a portion of the surface of the positional locator between the circumference of the inner race and the outer circumference of the positional locator, which coincides with the interface area of the positional locator and the thrustwashers.

The fixed rolling element bearing assembly may further comprise an outer race rigidly connected to the housing and extending circumferentially around the cage and rolling element assembly.

BRIEF DESCRIPTION OF THE DRAWINGS:

The invention is described by way of example to the accompanying drawings in which.

DESCRIPTION OF PREFERRED EMBODIMENTS:

The invention is now described with reference to examples and embodiments.

Figure 1:
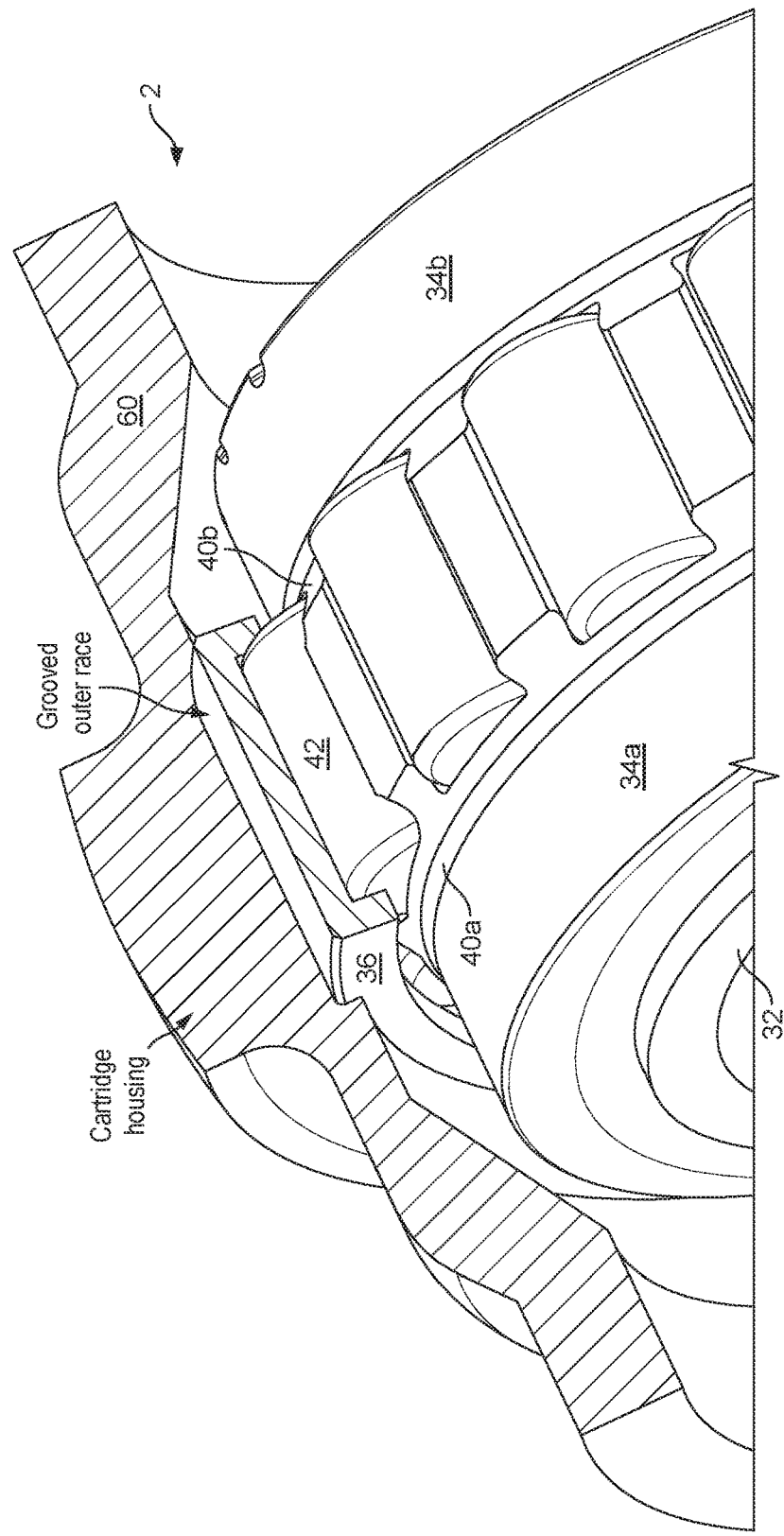
FIG. 1 illustrates a perspective view of part of a fixed rolling element bearing assembly, comprising clamp ring assembly, cage and rolling element assembly, and fixed outer race (with guide lips) assembled in a housing.
Figure 2:
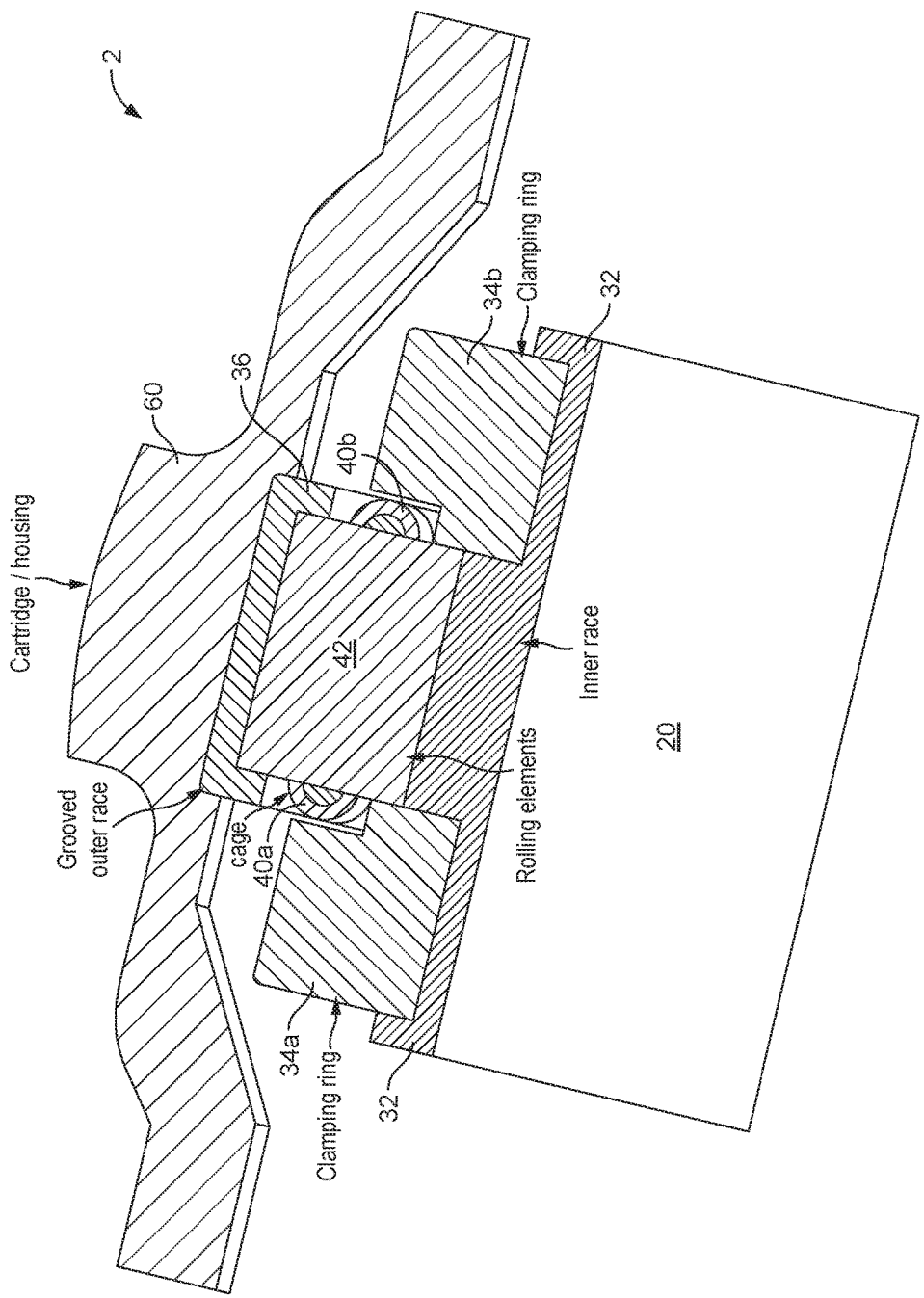
FIG. 2 illustrates a cross-sectional view of the fixed rolling element bearing assembly of FIG. 1.

With reference to FIG. 1 there is illustrated a perspective view of a fixed rolling element bearing assembly, and in particular a clamp ring assembly 2, which is described in conjunction with FIG. 2. FIG. 2 illustrates a cross-sectional view of the arrangement of FIG. 1, formed around a shaft 20 in accordance with a prior art arrangement. Some detail of this cross-sectional view is eliminated for ease of understanding. Only the top part of the cross-sectional view is shown in FIG. 2.

The clamp ring assembly 2 includes an inner race 32 secured around the shaft 20. The inner race has an axial dimension along the shaft. The inner race forms a collar around the shaft 20. The inner race may be formed of two parts which are clamped together to form the collar around the shaft 20.

In the illustrated example, associated with the inner race 32 are two clamp rings 34a and 34b. The clamp rings 34a and 34b clamp the inner race 32 to the shaft. One clamp ring 34a is disposed at one axial end of the inner race 32, and the other clamp ring 34b is disposed at the other axial end of the inner race 32. A space is provided between the two clamp rings. The inner race 32 preferably has a lip at its respective ends to provide a positioning location for the clamp rings 34a and 34b. A central lip or lips may also be provided on the inner race 32 so as each clamp ring 34a, 34b is positioned between a central lip and an outer radial lip. The clamp rings 34a and 34b clamp the inner race 32 to the shaft, and are annular clamp rings formed around the inner race 32.

Each clamp ring 34a and 34b may be formed of two parts which are connected together around the inner race 32.

In the illustration of FIG. 2 the inner race 32 and the clamp rings 34a, 34b are distinct elements. The structure is not limited to these specifics though, and for example the inner race and the clamp rings could be formed of a single piece of material.

An opening is formed between the clamp rings 34a and 34b. In this opening, between the clamp rings 34a and 34b, the inner race preferably extends radially away from the shaft 20, to provide a surface which is raised relative to the surfaces of the inner race with which the clamp rings engage.

A cage and rolling element assembly is positioned within this opening. Reference numerals 40a and 40b denote the edges of the cage. The cage and rolling element assembly may be formed in a number of ways, and in this example includes a plurality of rolling elements positioned around the circumference of the cage. A rolling element 42 is illustrated. The reference numerals 40a and 40b denote the circumferential edges of the cage within which the rolling elements are housed.

The cage and rolling element assembly is configured to rotate around the inner race 32, between the clamping rings 34a and 34b. The inner race is fixed to the shaft by the clamping rings 34a and 34b, and rotates in accordance with rotation of the shaft 20. The cage and rolling element assembly is configured to rotate around the inner race 32.

An outer race (fixed bearing) 36 is also shown, which is held within a housing and provides a running surface for the rolling elements of the cage and rolling element assembly. The outer race 36 in this example is positioned around the rolling elements of the cage and rolling element assembly. The outer race as illustrated extends along the length of the rolling elements, and then extends downwardly partially along both rolling element end faces, forming guide lips.

The fixed rolling element bearing assembly is housed in a housing or cartridge 60. The outer race 36 engages with an appropriately shaped opening in the surface of the housing or cartridge 60. This engagement holds the assembly in place and rigidly holds the outer race 36.

The operation of the arrangement as shown is as follows. The shaft 20 rotates, and the inner race 32 correspondingly rotates. The cage and rolling element assembly rotates around the inner race. The outer race 36 is fixed relative to the cartridge or housing 60.

The rolling elements are driven by the rotation of the inner race 32 and hence also by the shaft 20 rotation. As the shaft 20 rotates, the inner race 32 which is clamped to it rotates at the same rotational speed, and this in turn causes the rolling elements 42 to rotate—as they are in contact with the inner race 32. As the rolling elements 42 rotate they in turn begin to travel along the surface of the outer race 36 as they are also in contact with the outer race 36 as well as the inner race 32. As the outer race 36 is held stationary within the housing/cartridge 60, the rolling elements 42 (and hence the cage within which they are held) begin to travel around the outer race 36 in the same rotational direction as the inner race 32 and shaft 20.

Figure 3:
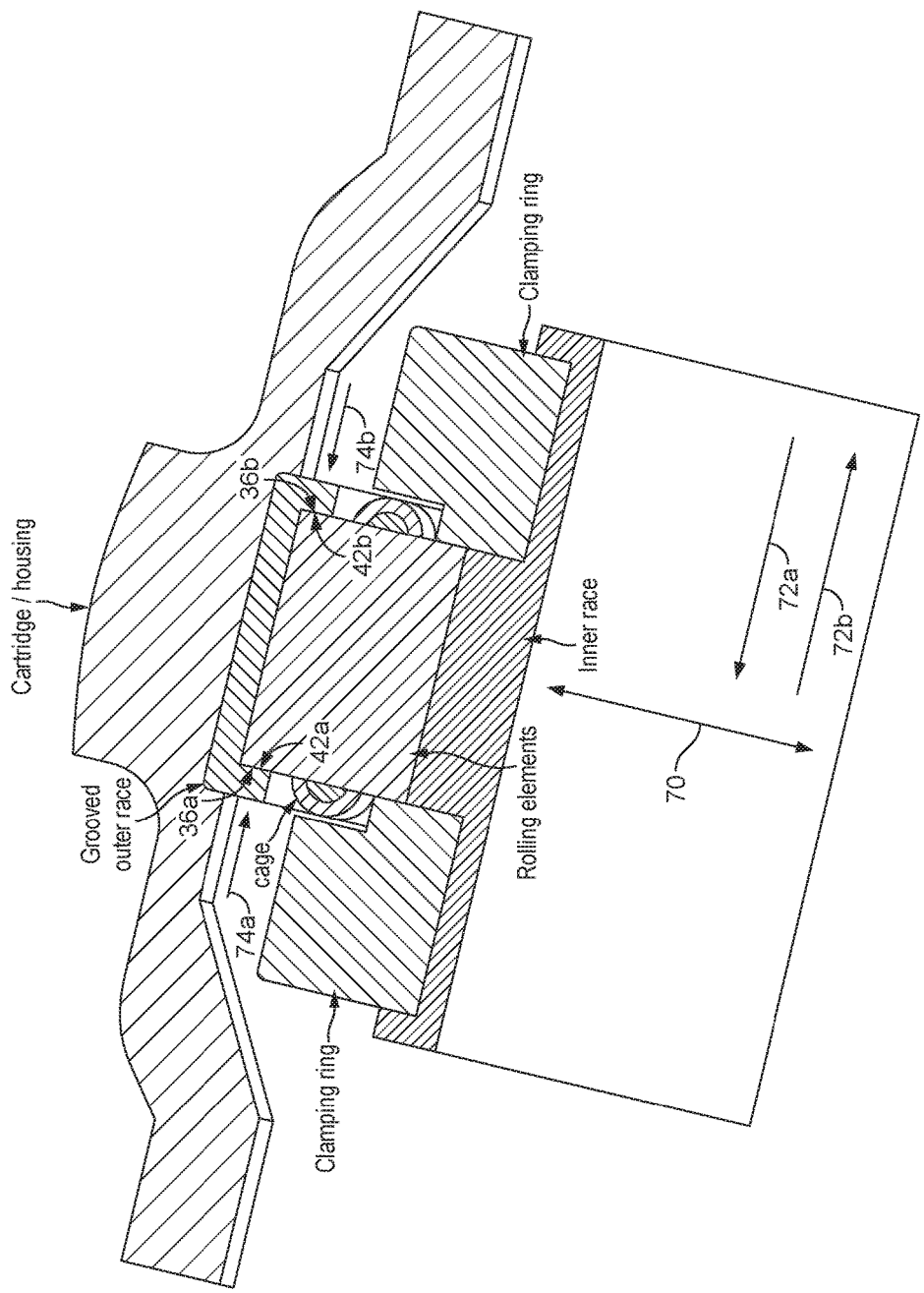
FIG. 3 illustrates the axial and radial forces that may be applied in the arrangement of FIG. 2.

As further denoted in FIG. 3, during operation an axial load force and a radial load force can be present. In FIG. 3 an applied radial force is denoted by bidirectional arrow 70, a first applied axial load force is denoted by reference numeral 72a, and a second applied axial load force is denoted by reference numeral 72b.

The applied radial load force 70 is perpendicular to the axis of the shaft 20, and applied by the shaft and hence inner race 32 and hence radial faces (the cylindrical sides) of the rolling elements.

The applied axial load force is parallel to the axis of the shaft 20, and at any instant in time is either applied in a leftwards direction (looking at FIG. 3) as denoted by arrow 72a, or applied in a rightwards direction as denoted by arrow 72b. The applied axial load force 72a is reacted to by an axial reaction force denoted by numeral 74a. The axial reaction force is handled by the guide lips of the outer race 36, and the end faces of the rolling elements 42. Specifically, this axial reaction force is handled by the small overlapping surface of the outer race 36 guide lips and the rolling element end faces (of which rolling element 42 is an example), as denoted by reference numerals 36a and 42a in FIG. 3. Thus the axial load is placed on this interface.

The applied axial load force 72b is reacted to by an axial reaction force denoted by reference numeral 74b. The axial reaction force 74b is handled by the guide lips of the outer race 36, and the end faces of the rolling elements 42. Specifically this axial reaction force is handled by the small overlapping surface of the outer race 36 guide lips and the rolling element end faces (of which rolling element 42 is an example), as denoted by reference numerals 36b and 42b in FIG. 3. Thus the axial load is placed on this interface.

It will be understood that axial force can be applied in either direction, and the resultant will always be a reaction force in the opposite direction. Hence axial load will be handled by either one interface or the other, but never both at the same time.

The overlapping surfaces of the clamping ring lips and the rolling element end faces are what apply the axial load applied by the shaft to the rolling element bearing, and this is reacted to by the overlapping surfaces of the outer race lips and the rolling element end faces.

The arrangement of FIGS. 1 to 3 illustrate a fixed rolling element bearing arrangement, in which the outer race 36 is grooved/lipped and formed around the rolling element end faces.

In an alternative free rolling element bearing arrangement, the outer race does not have grooves/lips formed around the rolling element end faces. This is illustrated by the alternative views of FIGS. 4 and 5, corresponding to FIGS. 1 and 2 respectively. As can be seen, the outer race 36 is replaced with an outer race 80 which extends along the surface of the rolling elements, but does not extend downwardly partially along the end faces of the rolling elements. Thus the rolling elements are not axially constrained by the outer race, providing a free rolling element bearing assembly rather than a fixed rolling element bearing assembly. Otherwise the arrangement of FIGS. 4 and 5 corresponds to the arrangement of FIGS. 1 and 2.

Figure 4:
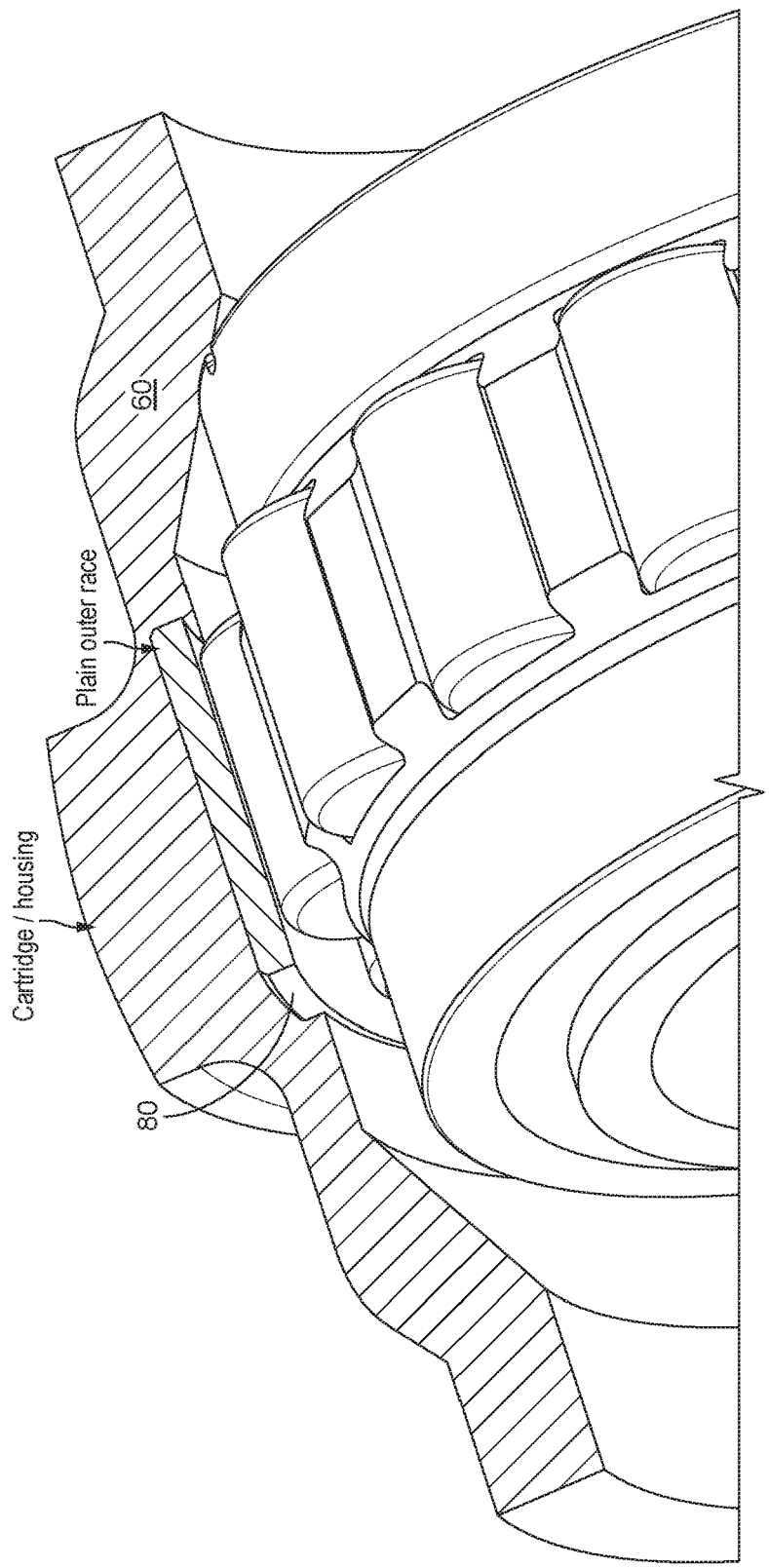
FIG. 4 illustrates a perspective view of part of a free rolling element bearing assembly, which is similar to FIG. 1 but shows a free planar outer race (no guide lips) assembled in the housing.
Figure 5:
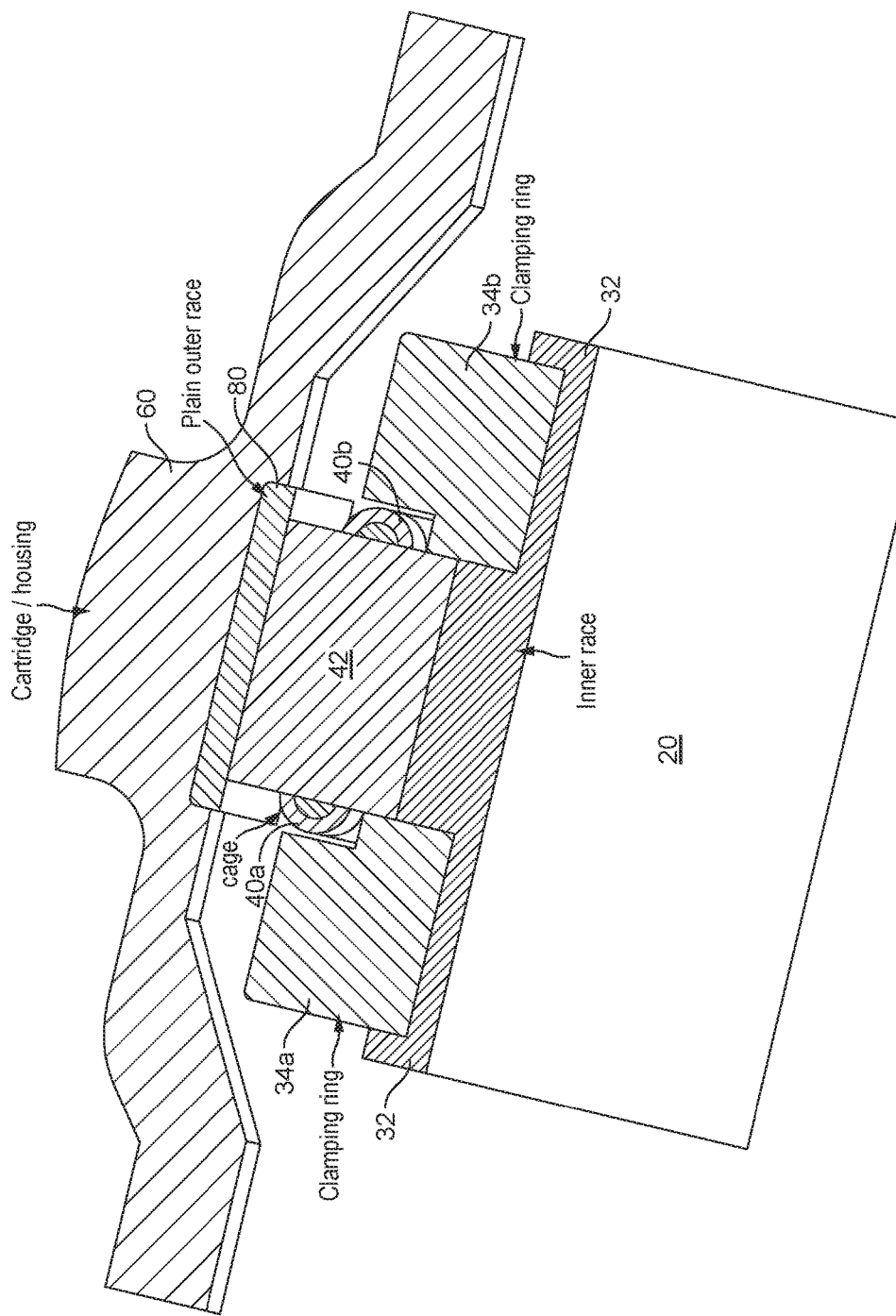
FIG. 5 illustrates a cross-sectional view of the free rolling element bearing assembly of FIG. 4, and illustrates that only radial forces may be applied in the arrangement of FIG. 4.

In the free rolling element bearing arrangement as shown in FIGS. 4 and 5, there is no ability to react to an applied axial force. The interface of the clamping ring lips with the end faces of the rolling elements merely acts to axially locate the rolling elements and hence the cage and rolling element assembly within which they are contained. The whole rolling element bearing assembly is otherwise free to axially move along the outer race.

This axial movement is desirable to allow for the free rolling element bearing assembly to be mounted and allow thermal expansion of the shaft to which it is fitted when the shaft is also held in place by a fixed bearing at a distance away from the free bearing position. Only one fixed bearing is provided on a continuous shaft, and all other support bearings have to be free bearings to allow for this expansion of the shaft with temperature.

An improvement is now described. This improvement is described in the context of the free rolling element bearing arrangement, and shows an alternate method of reacting axial applied force, different to the use of guide lips on the outer race.

The improvement replaces the fixed rolling element bearing arrangement described previously with reference to FIGS. 1 and 2, in which the axial load is reacted to by the interface of the rolling element end faces with the grooves/lips of the fixed bearing outer race, with a modified free bearing arrangement. The modified free bearing arrangement is able to handle applied axial forces via the use of thrustwashers added to the housing/cartridge that allow applied axial loads to be reacted to by an interface with the edges of the clamping rings and the faces of the added thrustwashers. This is now further described.

Figure 6:
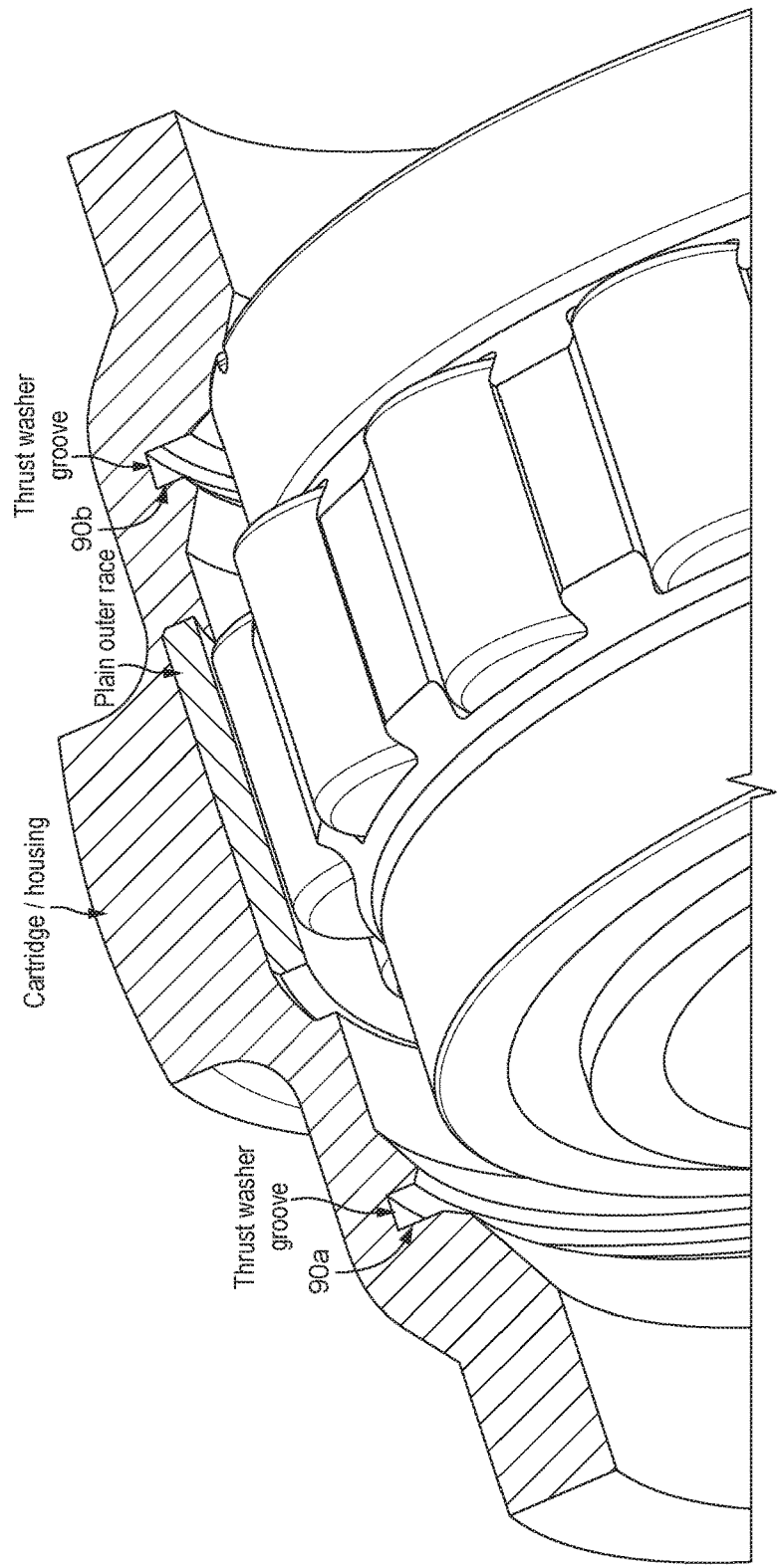
FIG. 6 illustrates a first stage of how the arrangement of FIG. 4 may be modified to achieve an exemplary improved fixed rolling element bearing assembly, showing the housing recesses created to accommodate thrustwashers.
Figure 7:
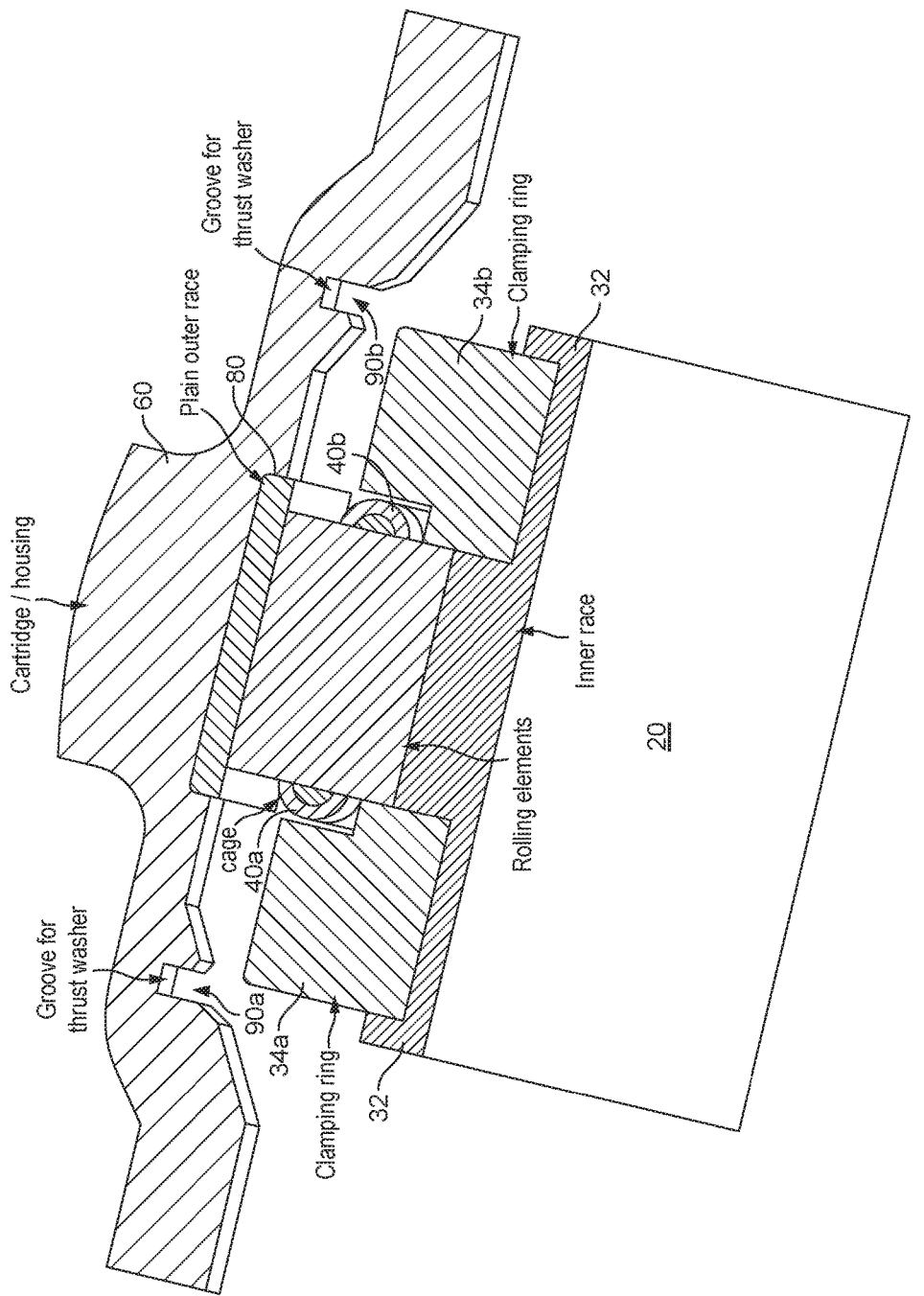
FIG. 7 illustrates a cross-sectional view of the exemplary modified free rolling element bearing assembly of FIG. 6.

FIG. 6 corresponds to the illustration of FIG. 4, but the housing or cartridge 60 is modified. As illustrated the cartridge or housing 60 is provided with two annular grooves 90a, 90b formed in the inner circumference thereof. Similarly FIG. 7 corresponds to the illustration of FIG. 5, illustrating a cross-section—with the formed grooves 90a, 90b shown.

Figure 8:
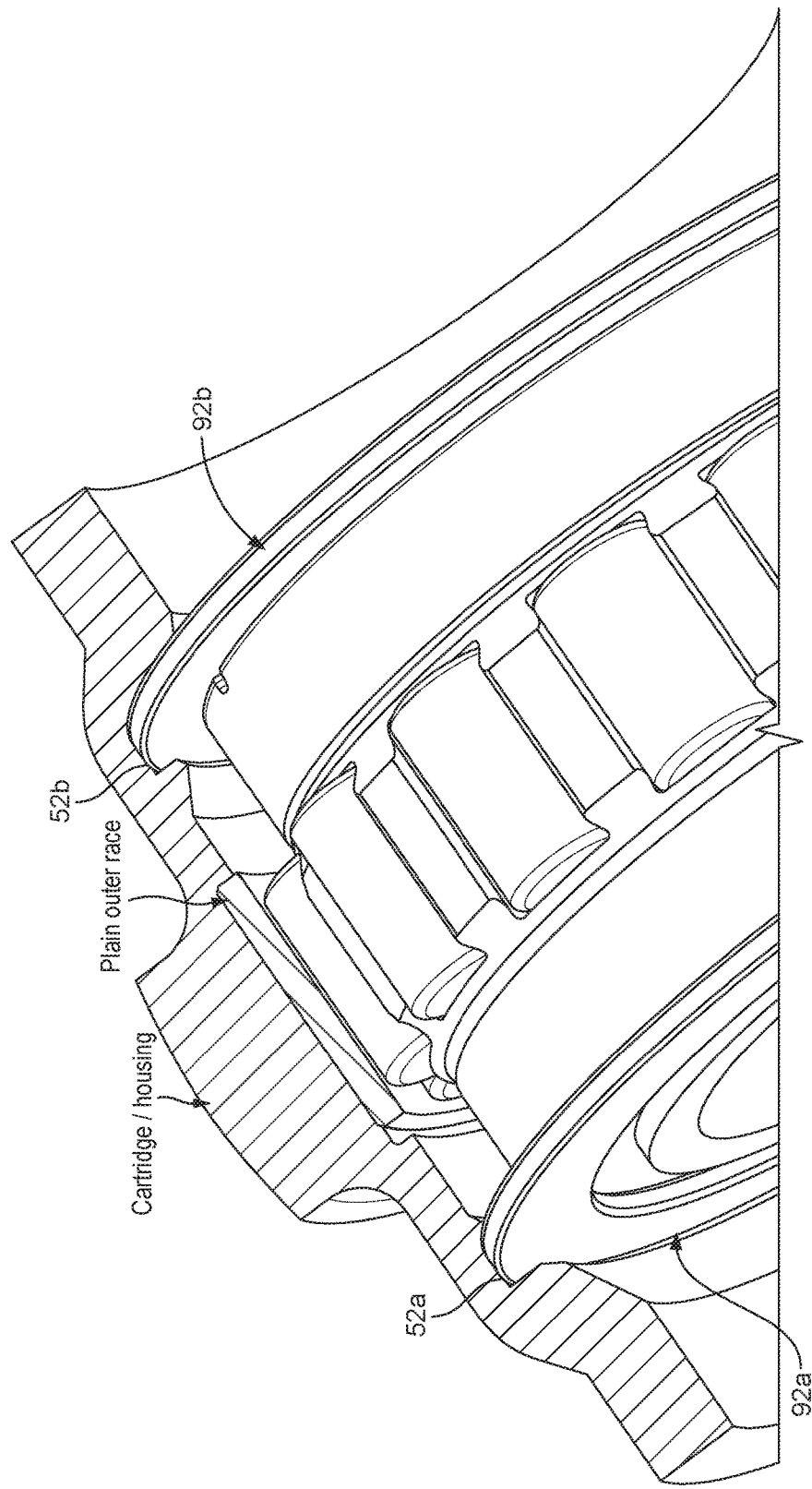
FIG. 8 illustrates a second stage of how the arrangement of FIG. 4 may be modified to achieve an exemplary improved fixed rolling element bearing assembly, showing the insertion of thrustwashers into the housing recesses shown in FIG. 6.
Figure 9:
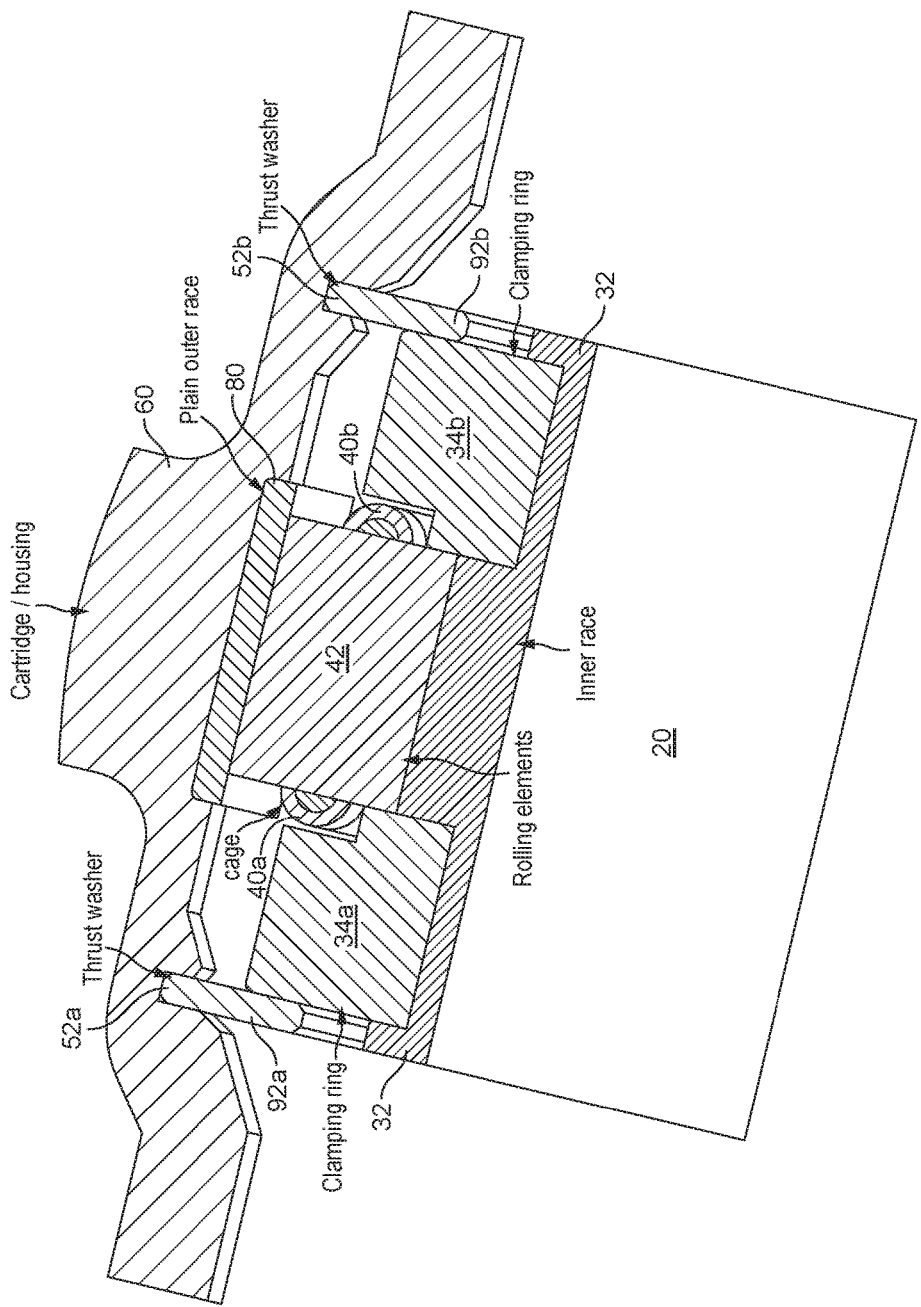
FIG. 9 illustrates a cross-sectional view of the arrangement of FIG. 8.

FIG. 8 is an illustration corresponding to the illustration of FIG. 6, but with the inclusion of two thrustwashers 92a, 92b which engage with the annular grooves formed in the cartridge or housing 60. Similarly FIG. 9 is a cross-section corresponding to the cross-section of FIG. 7, with the formed grooves 90a, 90b including the thrustwashers 92a, 92b.

The thrustwashers are secured within the housing, and prevented from rotating under the applied axial load. The applied axial load, applied to the shaft, and hence the inner race, and hence to the clamping rings, is now reacted to by the interface of the end faces of the clamping rings and the thrustwashers, not by the interfaces of the clamping ring lips/roller end faces and roller end faces/outer race grooves/lips.

Each thrustwasher 92a, 92b has an outer circumference, 52a, 52b, which as noted above defines a diameter for each thrustwasher which is greater than the outer diameter of the clamp rings 34a, 34b, and which is also greater than the outer diameter of the rolling element cage 40 (with rolling elements) and outer race. Although this is the characteristic of the arrangement of FIG. 9, the need to be greater than the outer diameter of the cage and rolling element assembly is not necessary. All that is needed is for there to be an interface between the clamping rings and the thrustwashers, which has no relevance to the cage and rolling element assembly.

The provision of the outer race remains desirable.

The planar outer race in the modified bearing provides the rolling element surface to deal with the applied radial load. The thrustwashers are used to handle applied axial load. It is desirable that there is an overlap between the inner diameter of the thrustwashers and the outer diameter of the clamping rings to enable interface surfaces between the thrustwasher and clamping rings. The dimensions of the cage and rolling element assembly are irrelevant, but the clamp ring outer diameter is greater than the thrustwasher inner diameter.

The outer circumference of the thrustwashers is positioned within the housing 60. As is shown in the figures, the outer circumference portions 52a, 52b of the thrustwashers 92a, 92b are accommodated in the grooves 90a, 90b of the housing 60.

The thrustwashers 92a, 92b are maintained in a fixed relationship with respect to the housing 60, and this ensures positioning of the clamping rings (and hence shaft 20) in a particular axial position.

The thrustwashers are accommodated rigidly in the housing, and they cannot rotate with respect to the housing.

The thrustwashers effectively convert the free bearing arrangement of FIG. 5 into a fixed bearing equivalent of FIG. 3, with axial load being handled by the interface of the thrustwasher upon the clamping ring surface, instead of the interface of the end face of the rolling elements against the fixed bearing outer race lip.

Figure 10:
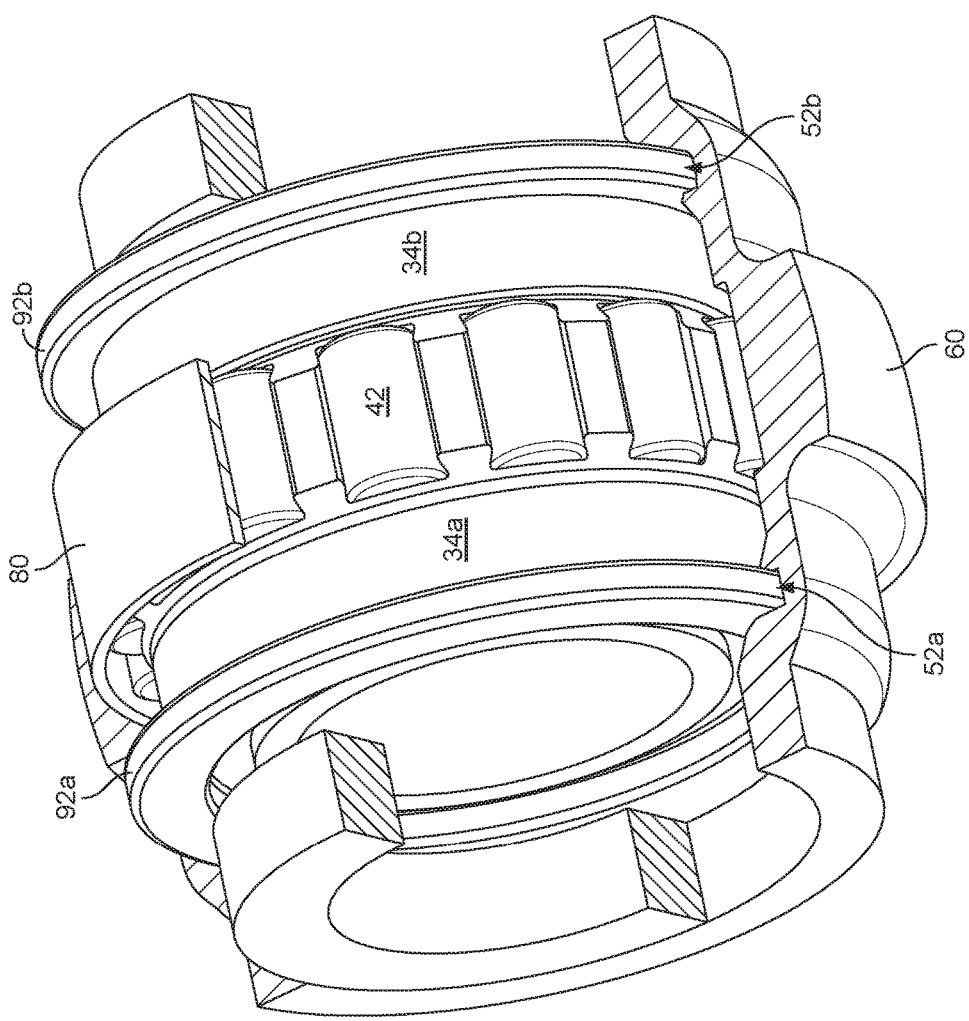
FIG. 10 illustrates a further perspective view of an exemplary improved fixed rolling element bearing assembly showing shaft seals either end of the housing.

FIG. 10 is a perspective view of the whole assembly in the housing. The sleeve 80 in FIG. 10 is the free bearing outer race, used to handle the applied radial load. It is the same as the grooved/lipped fixed bearing outer race, but without the grooves/lips. It is a part of the radial component of the bearing.

Figure 11:
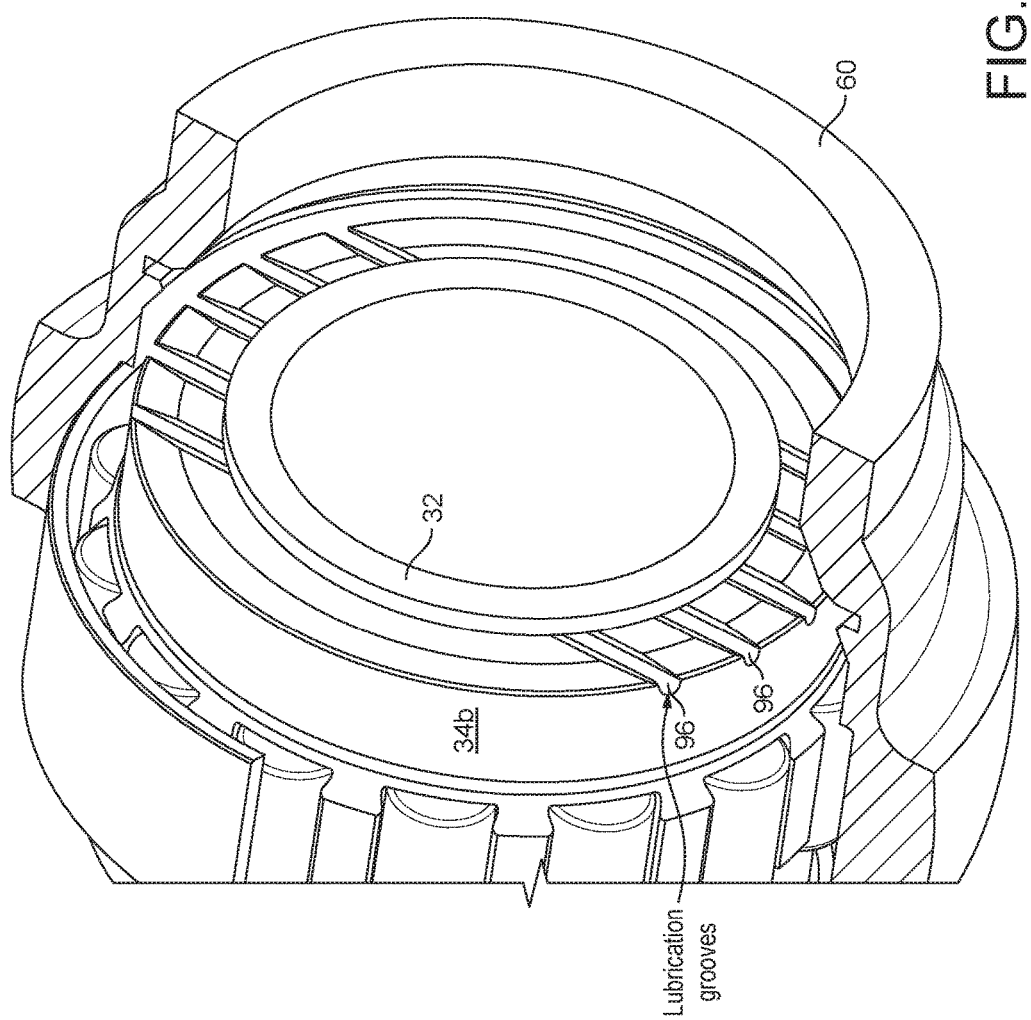
FIG. 11 illustrates a perspective view of additional exemplary improvements to the arrangement of FIG. 8, namely the addition of lubrication grooves on the clamp ring assembly.

FIG. 11 is a perspective view similar to that of FIG. 10, with the housing 60 cut-away, but omitting the thrustwashers 52a, 52b and shows further example implementation detail. The detail shown is the shaft seals that seal the end bores of the housing to the shaft.

In FIG. 11 the clamp ring 34b is shown to be formed above the inner race 32. A stepped shape is formed at the edges of the clamp ring 34b and the inner race, consistent for example with the arrangement of FIG. 7.

As shown in FIG. 9, the step portion allows for the accommodation of the thrustwasher 92b without the axial dimension of the clamp ring assembly increasing beyond the axial dimension of the inner race 32.

As shown in FIG. 11, the clamp ring is provided with grooves 96 along its radial surface, extending from its outer circumference radially to the inner race 32. These grooves are lubrication grooves, and allow for the flow of lubricant into the interface area between the clamping rings and the thrustwashers. These grooves do not necessarily have to extend all the way to the inner race 32, nor fully out to the outer circumference of the clamping ring.

In use, with the thrustwasher 92b fitted, the clamping ring 34b and the inner race 32 rotate, and the thrustwasher 92b is static. Thus the clamping ring 34b and the inner race 32 rotate relative to the thrustwasher 92b. The lubricant in the grooves 96 provides lubrication of the interface area of this relative movement.

With FIG. 11 is shown an optional implementation detail, which are the shaft seals that can either be fitted to the housing and rub against the shaft, or fitted to the shaft and rotate against the housing end bores.

The lubricant is for the interface of the rotating inner race/clamp ring (clamp ring assembly) and the static thrustwashers. There is no objective, in adding the thrustwashers, not to increase the overall axial length of the clamp ring assembly. The inner race usually has a step on the end to axially locate the clamping ring. It does not have to be either greater than or equal to the width of the thrustwashers.

Figure 12:
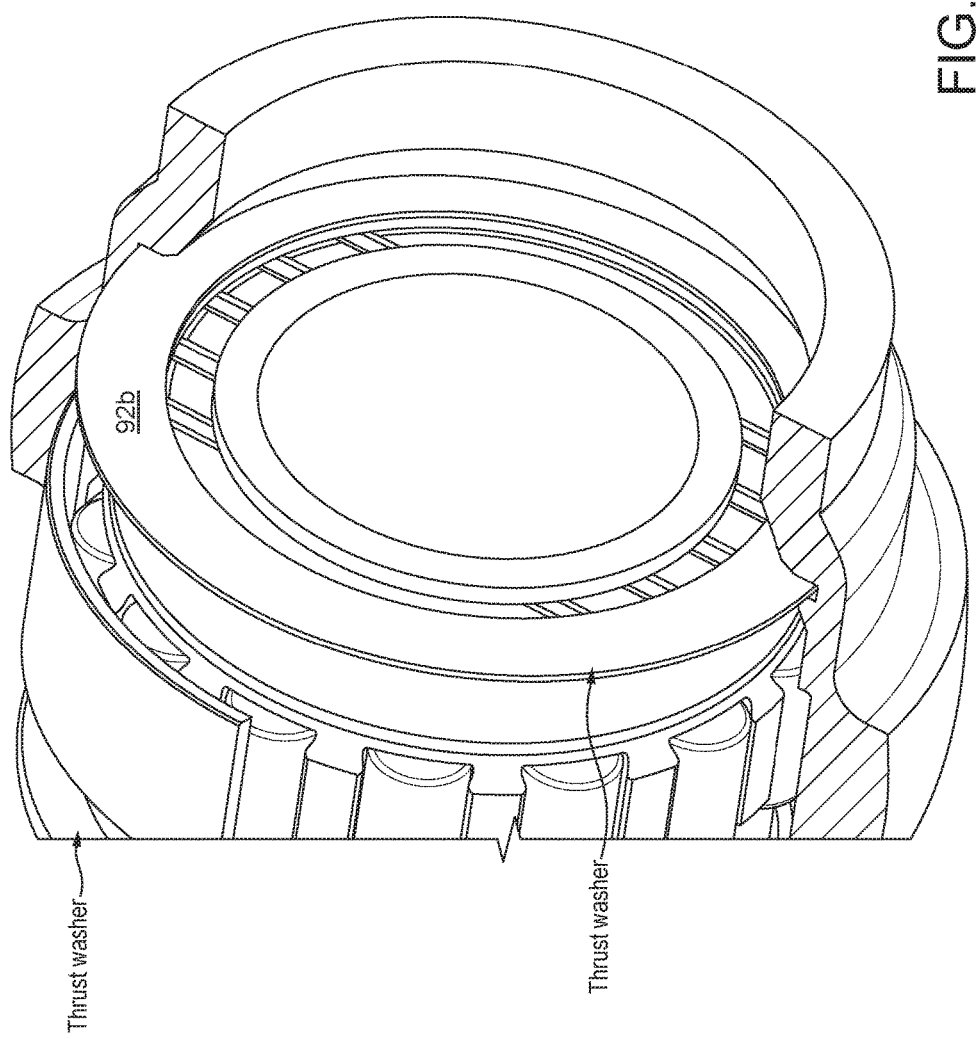
FIG. 12 illustrates the exemplary addition of the thrustwashers to the arrangement of FIG. 11.

A stepped structure is provided by the lip on the end of the inner race that is used to axially locate the clamping ring. FIG. 12 shows the perspective of FIG. 11 with the thrustwasher 92b included. As can be seen the thrustwasher 92b has a dimension such that the inner diameter of thrustwasher 92b allows a spacing between the inner circumference of the thrustwasher 92b and the inner race 32.

FIG. 12 shows a gap between the inner circumference of the thrustwasher and the inner race, which may let lubricant flow. There does not have to be a gap, but for lubricant flow this would seem to make sense, along with the use of the lubrication grooves 96 on the clamping ring end faces. There is no requirement for there to be a certain spacing between the inner circumference of the thrustwasher and the inner race. Also there is no reason why the thrustwasher inner diameter could not also interface with the end face of the inner race 32 as well as or instead of the end face of the clamping ring—this may be an additional design option.

Figure 13:
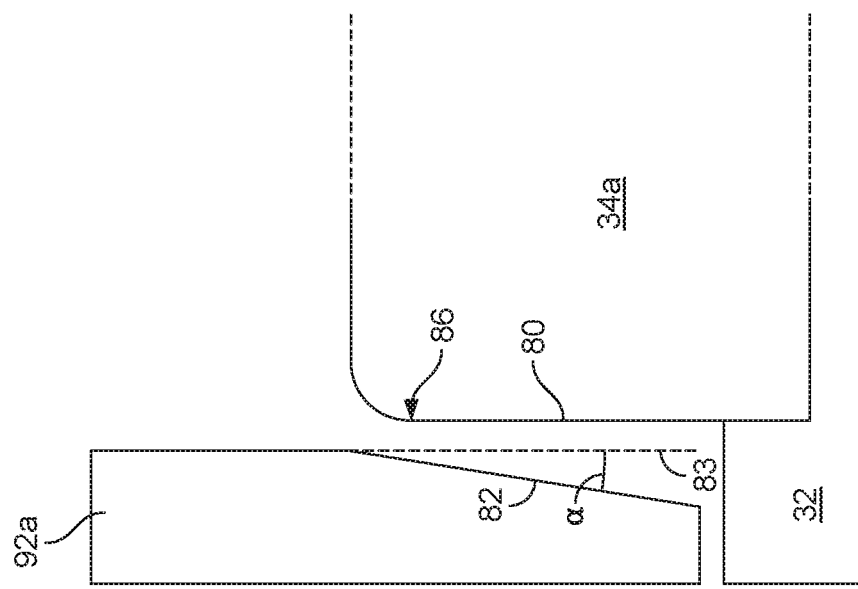
FIG. 13 illustrates further detail of the exemplary improved fixed rolling element bearing assembly, namely the interface of a thrustwasher and a clamping ring.

FIG. 13 illustrates a close-up representation of the thrustwasher 92a adjacent the clamping ring 34a. The thrustwasher surface 82 which is adjacent the clamping ring 34a is preferably formed of a flat tapered surface. Reference numeral 82 denotes the actual surface of the thrustwasher 92a, and dashed line 83 denotes the outline of the surface of the thrustwasher if it was not tapered. The tapered surface 82 is at an angle $\alpha$ with respect to the perpendicular surface 83. The portion of the clamp ring 34a which is adjacent the thrustwasher 92a is preferably a spherical surface. The dimensions are exaggerated in FIG. 13 for ease of illustration. Thus the clamping ring 34a has a surface 86 which is spherical adjacent the thrustwasher 92a as it moves along toward its top surface.

The tapering of the surface of the thrustwasher and the spherical surface of the clamping ring prevents rubbing forces at this interface, and encourages lubrication.

In the above an improvement is described where two thrustwashers are provided, one on either side of the arrangement. However in alternatives only one thrustwasher may be provided.

There is described an improvement in relation to adding two thrustwashers to the housing to react axial load in both directions (one either end of the clamp ring assembly, held within the housing). There may be a requirement to use just the addition of one thrustwasher to react axial load applied in one direction only. It is known in the art for fixed bearings to exist with one guide lip only on the outer race, and for these bearings to be used in pairs, with one reacting axial load applied in one direction, and the other reacting the axial load applied in the other direction. When using these bearings in pairs like this, it is possible to allow some axial movement of the shaft, with the axial movement being 'restrained' between limits—these limits being the guide lips, or in the improved design the thrustwashers. The rolling elements still handle the radial load as the planar part of the outer race is longer than the rolling elements, allowing axial movement of the rolling elements whilst still running on the planar surface of the outer race.

The thrustwashers (or thrustwasher) may be a one piece element, formed from a single material, or may be constructed of two or more elements, formed from the same material or even different materials. Whichever method of construction is used, the principle of operation is the same, namely that they act to restrict the axial movement of the positional locators of the clamp ring assembly, and react any axial load force applied.

The fixed rolling element bearing as described may be a solid or split rolling element bearing assembly. The clamp ring assembly may thus be a solid-type or split-type assembly. A split variety assembly may be held to the shaft by split clamping rings. A solid variety may be held to the shaft by many different methods, such as heat shrinkage, bonding, tapered sleeves pulled/pushed by lockscrews underneath tapered bores etc.

The described use of positional locators on the clamp ring assembly to axially locate the clamp ring assembly via the use of thrustwashers located within the housing (rather than using the end faces of the rolling elements to axially locate the clamp ring assembly) applies to solid or split assemblies.

The invention has been described with reference to particular examples, features of which may be combined. Not all described features are essential.

What is claimed is:

1. A fixed rolling element bearing assembly comprising:
   a housing;
   an inner race for attaching to a rotating shaft;
   a cage and rolling element assembly positioned around the inner race;
   a first positional locator and a second positional locator, the first and second positional locators for positioning the cage and rolling element assembly between inner edges thereof;
   a first thrustwasher adjacent an outer edge of either the first or second positional locator and fixably connected to the housing; and
   lubrication grooves on the outside edges of at least one of the first and second positional locators.

2. The fixed rolling element bearing assembly of claim 1, further comprising a second thrustwasher, the first and second thrustwashers each respectively adjacent an outer edge of a respective one of the first and second positional locators and fixably connected to the housing.

3. The fixed rolling element bearing assembly of claim 1 wherein the first positional locator comprises a first protrusion and the second positional locator comprises a second protrusion, the first and second protrusions on the inner race.

4. The fixed rolling element bearing assembly of claim 1 wherein the first positional locator comprises a first clamping ring and the second positional locator comprises a second clamping ring, the first and second clamping rings for clamping the inner race to the rotating shaft.

5. The fixed rolling element bearing assembly of claim 1 in which the first positional locator comprises a first circumferential protrusion around the inner race and the second positional locator comprises a second circumferential protrusion around the inner race, the first and second circumferential protrusions being spaced apart from each other by a distance to accommodate the cage and rolling element assembly.

6. The fixed rolling element bearing assembly of claim 1 wherein the cage and rolling element assembly is rotatable with respect to the inner race.

7. The fixed rolling element bearing assembly of claim 1 wherein the inner race is provided with a circumferential protrusion between the first and second positional locators to provide a diameter dimension to accommodate the cage and rolling element assembly.

8. The fixed rolling element bearing assembly of claim 1 wherein the first thrustwasher has an outer circumference with a first diameter and an inner circumference with a second diameter smaller than the first diameter, the inner circumference of the first thrustwasher being smaller than an outer circumference of the first positional locator, wherein the first positional locator is shaped to allow the first thrustwasher to be located adjacent the first positional locator and around the inner race.

9. The fixed rolling element bearing assembly of claim 1 wherein the lubrication grooves extend in a portion of the surface of the first positional locator between the circumference of the inner race and the outer circumference of the first positional locator, which coincides with an interface area of the first positional locator and the first thrustwasher.

10. The fixed rolling element bearing assembly of claim 1 further comprising an outer race rigidly connected to the housing and extending circumferentially around the cage and rolling element assembly.

* * * * *